United States Patent
Gauthier

(10) Patent No.: US 6,484,831 B1
(45) Date of Patent: Nov. 26, 2002

(54) HYBRID ELECTRIC VEHICLE

(75) Inventor: Greg Edward Gauthier, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/616,719

(22) Filed: Jul. 14, 2000

(51) Int. Cl.[7] .............................................. B60K 1/00
(52) U.S. Cl. ................................... 180/65.2; 180/53.5
(58) Field of Search ............................. 180/65.2, 65.3, 180/65.4, 53.1, 53.5, 53.8, 53.7; 477/2, 3, 5, 6

(56) References Cited

U.S. PATENT DOCUMENTS

| | | | | |
|---|---|---|---|---|
| 5,285,862 A | * | 2/1994 | Furutani et al. | 180/65.4 |
| 5,292,108 A | * | 3/1994 | Sutton | 254/323 |
| 5,558,173 A | * | 9/1996 | Sherman | 180/53.8 |
| 5,558,588 A | * | 9/1996 | Schmidt | 475/5 |
| 5,669,842 A | * | 9/1997 | Schmidt | 475/5 |
| 5,725,064 A | * | 3/1998 | Ibaraki et al. | 180/65.2 |
| 5,755,303 A | * | 5/1998 | Yamamoto et al. | 180/65.2 |
| 5,931,757 A | * | 8/1999 | Schmidt | 475/2 |
| 6,006,620 A | * | 12/1999 | Lawrie et al. | 74/335 |
| 6,048,288 A | * | 4/2000 | Tsujii et al. | 477/5 |
| 6,090,005 A | * | 7/2000 | Schmidt et al. | 475/5 |
| 6,116,363 A | * | 9/2000 | Frank | 180/65.2 |
| 6,116,368 A | * | 9/2000 | Lyons et al. | 180/165 |
| 6,202,776 B1 | * | 3/2001 | Masberg et al. | 180/65.2 |
| 6,209,672 B1 | * | 4/2001 | Severinsky | 180/65.2 |

FOREIGN PATENT DOCUMENTS

| | | |
|---|---|---|
| EP | 0882887 A2 | 6/1998 |
| EP | 0908619 A1 | 10/1998 |

* cited by examiner

Primary Examiner—Paul N. Dickson
Assistant Examiner—David R. Dunn
(74) Attorney, Agent, or Firm—Chupa & Alberti PC

(57) ABSTRACT

A hybrid vehicle 10 including a power take off assembly 20 which is selectively and solely operated by the cooperative combination of a battery 22 and a motor 16 with the amount of electrical charge which is resident within the battery 22 is depleted by a certain amount. Upon such depletion, the internal combustion engine 12 is activated to provide electrical charge to the battery 22.

13 Claims, 1 Drawing Sheet

HYBRID ELECTRIC VEHICLE

FIELD OF THE INVENTION

The present invention generally relates to a hybrid vehicle and more particularly, to a hybrid electric vehicle having a power take off portion which is operated by a vehicle battery which selectively receives electrical charge from an internal combustion engine.

BACKGROUND OF THE INVENTION

Hybrid electric vehicles typically include an internal combustion engine and an induction motor (or another type of energy source) which are each respectively adapted to selectively provide torque or rotational energy to a driveshaft. The induction motor is typically operated by the use of an electrical battery.

A hybrid electric vehicle may further include a "power take off" assembly which allows a portion of the provided torque or rotational energy which is coupled to the driveshaft to be used to operate a variety of auxiliary or utility type of assemblies (i.e., a "lift" assembly). Such a hybrid electric vehicle could be used, for example and without limitation, by a wide variety of business enterprises such as an electrical utility enterprise and/or a telephone enterprise which selectively and respectively employs these power take off assemblies to power or operate a lift assembly, effective to place an individual in close proximity to a portion of a telephone or power system which is to be repaired or serviced. Other business enterprises may use these power take off assemblies to perform a variety of other operations (e.g., selectively moving a tilt bed).

While hybrid electric vehicles do allow for the selective operation of these power take off assemblies, they require the concomitant and continued operation of an internal combustion engine which "powers" or operates the various assemblies. The internal combustion engine therefore continuously creates undesired noise and undesirably increases overall fuel consumption. Such noise generation is of particular concern to homeowners and other individuals in close proximity to one of these prior vehicles since these power take off assemblies are typically operated for a relatively long period of time in order to allow a necessary repair or other operation to be completed.

There is therefore a need for a hybrid vehicle having a power take off assembly which overcomes at least some of the previously delineated drawbacks associated with the power take off assemblies of prior hybrid vehicles.

SUMMARY OF THE INVENTION

It is a first object of the present invention to provide a hybrid vehicle which overcomes some or all of the previously delineated drawbacks of prior hybrid vehicles.

It is a second object of the present invention to provide a hybrid vehicle which overcomes some or all of the previously delineated drawbacks of prior hybrid vehicles and which selectively and quietly operates a power take off assembly.

It is a third object of the present invention to provide a hybrid electric vehicle which overcomes some or all of the previously delineated drawbacks of prior hybrid electric vehicles and which includes a power take off portion or component which is cooperatively operated by a battery and an induction motor.

It is a fourth object of the present invention to provide a method for operating a power take off assembly which overcomes some or all of the previously delineated drawbacks of prior methods.

According to a first aspect of the present invention, a hybrid vehicle is provided. The hybrid vehicle comprises a first source of energy; a second source of energy; a power take off assembly; a controller which is coupled to the first source of energy, to the second source of energy, and to the power take off assembly and which causes the first source of energy to selectively and solely operate the power take off assembly until the first source of energy is depleted by a certain amount and then which causes the second source of energy to provide energy to the first source of energy.

According to a second aspect of the present invention, a power take off assembly for use within a hybrid vehicle of the type having a first and a second energy source is provided. The power take off assembly comprises a power take off portion; and a controller which is coupled to the first and second energy sources and which selectively causes the power take off portion to be solely operated by the first energy source while allowing the second energy source to be operated only when a certain amount of energy has been depleted from the first energy source.

According to a third aspect of the present invention, a method for operating a power take off assembly by the use of a pair of energy sources is provided. The method comprises the steps of operating the power take off assembly by use of a first of the pair of energy sources while temporarily deactivating the second of the pair of energy sources and then activating the second of the pair of energy sources to provide energy to the first of the pair of energy sources.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
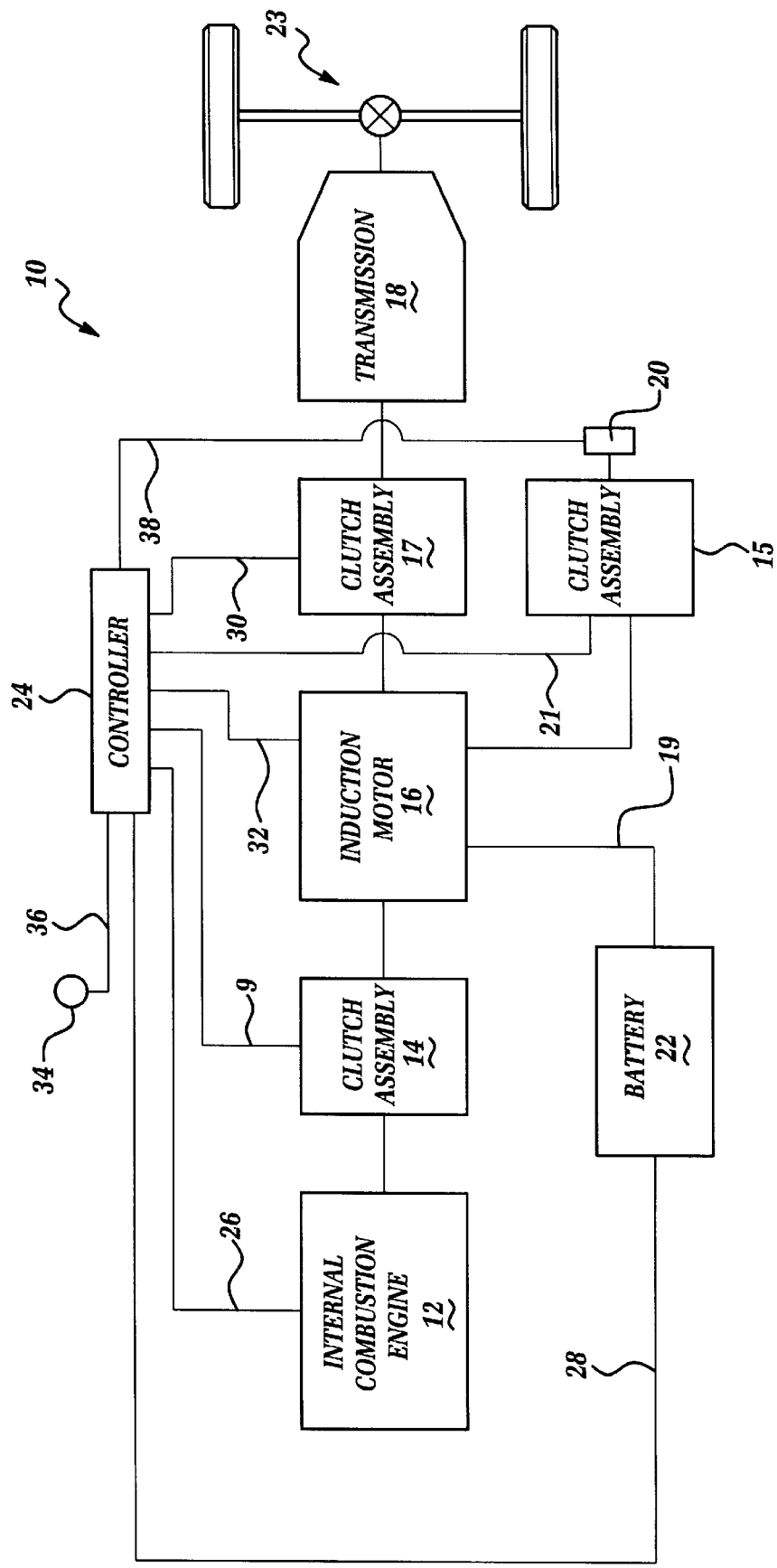
FIG. 1 is a block diagram of the power train portion or assembly of a hybrid electric vehicle which is made in accordance with the teachings of the preferred embodiment of the invention.

Referring now to FIG. 1, there is shown a power train portion or assembly 10 of a hybrid electric vehicle which is made in accordance with the teachings of the preferred embodiment of the invention. It should be realized that while the following discussion describes this selective operation of a power take off assembly within a hybrid electric vehicle, nothing in this Application is meant to limit the invention to use only with such a hybrid electric vehicle. Rather, this invention may be used with a vehicle having energy sources which are dissimilar from those which are shown in FIG. 1. Moreover, this invention is not limited to a particular type or configuration of a hybrid vehicle, but is applicable to a wide variety of dissimilar arrangements.

Particularly, power train assembly 10 includes an internal combustion engine 12 which is coupled to a clutch or coupling assembly 14. The clutch assembly 14 is coupled to an induction motor 16 and, as shown, the induction motor 16 is coupled to a "forward" and "reverse" clutch assembly 17. Further, assembly 10 includes a transmission 18 which is coupled to and/or which operatively and integrally contains the clutch assembly 17. Transmission 18 is further coupled to wheel and axle assembly 23, by use of a differential, and selectively receives torque from the internal combustion engine 12 and/or from the induction motor 16, by the cooperative operation of clutch assemblies 14, 17, and operatively transfers at least a portion of the received torque to the assembly 23, effective to allow the vehicle to be maneuvered. Assembly 10 further includes a "power take off" portion or component/member 20 which is selectively coupled to the induction motor 16 by the clutch assembly 15 and which selectively receives a portion of the torque produced by the induction motor 16, effective to operate a wide variety of utility type assemblies in the manner which is more fully set forth below.

Assembly 10 further includes an electric battery 22 which stores electrical charge and which is physically, communicatively, and controllably coupled to the induction motor 16 by bus 19, effective to selectively provide electrical power to the motor 16. Electric battery 22 may, in one non-limiting embodiment of the invention, be replaced by a fuel cell assembly or other type of energy storage device. Further, assembly 10 includes a controller 24 which is operable under stored program control and which is physically, communicatively, and controllably coupled to the engine 12 by bus 26, to the clutch assembly 15 by bus 21, to the clutch assembly 14 by bus 9, to the battery 22 by bus 28, to the clutch assembly 17 by bus 30, to the power take off portion 20 by bus 38, and to the induction motor 16 by bus 32. Assembly 10 further includes a selectively depressible control switch 34 which is physically, communicatively, and controllably coupled to the controller 24 by bus 36 and which selectively generates and transmits a "power take off" command signal to the controller 24 upon being selectively depressed. Controller 24, by use of bus 28, monitors the state of electrical charge of battery 22 and stores a charge threshold value which may be "fixed" by a user.

In operation, upon the activation or the selective depression of the switch 34, controller 24 issues a command to the induction motor 16, by bus 32, and causes the battery 22, by bus 28, to communicate electric energy to the motor 16 which is effective to activate or energize the motor 16, thereby causing the motor 16 to generate torque. Further, controller 24 issues another command signal to the clutch assembly 15, by bus 21, effective to cause the clutch assembly 15 to selectively couple the power take off portion 20 to the induction motor 16, thereby causing/allowing the power take off portion 20 to receive torque from the motor 16. Further, controller 24 generates control command signals to the engine 12, by bus 26, effective to cause the engine 12 to become temporarily deactivated if there is sufficient charge in the battery 22 (i.e., if the currently monitored amount of electric charge which is resident within the battery 22 is equal to or greater than the stored charge threshold value). In this manner, the power take off assembly 20 may be quietly operated solely from the cooperative combination of the motor 16 and the battery 22, thereby reducing the amount of generated noise and reducing the amount of fuel which must be utilized during the operation of the power take off assembly 20.

If, upon the selective depression of switch 34 or during the operation of the power take off component/portion 20, the amount of electric charge resident within the battery 22 is or "falls below" (i.e., is less than) the stored charge threshold value, controller 24 generates and communicates a control signal to the internal combustion engine 12, by use of bus 26, and to the clutch assembly 14 by bus 9. The control signals are effective to cause the internal combustion engine 12 to become activated or operative, thereby causing the engine 12 to be coupled to the motor 16, effective to allow electrical charge to be coupled to the battery 22 while the component 20 is being operated. In this manner, the battery 22 receives electrical charge. Once the amount of electrical charge which is resident within the battery 22 exceeds the stored threshold value, the controller 24 deactivates the internal combustion engine 12 and the power take off portion/component 20 continues to be operated solely by the combination of the motor 16 and the battery 22. The power take off portion may become selectively deactivated by a re-engagement of the switch 34 (e.g., by placing the switch 34 in the original position).

It is to be understood that the invention is not limited to the exact construction or method which has been delineated above, but that various changes and modifications may be made without departing from the spirit and/or the scope of the following claims.

What is claimed is:

1. A hybrid vehicle comprising:
    a first source of energy having a state of charge;
    an induction motor which is coupled to said first source of energy;
    an internal combustion engine which is selectively coupled to said induction motor;
    a differential assembly which is coupled to said internal combustion assembly and to said induction motor;
    a power take off assembly which is coupled to said induction motor; and
    a controller which is coupled to said first source of energy, to said induction motor, to said internal combustion engine, and to said power take off assembly, wherein said controller monitors said state of charge of said first source of energy and when said monitored state of charge falls below a certain amount said controller causes said internal combustion engine to provide energy to said first source of energy, wherein said controller further allows both of said internal combustion engine and said induction motor to provide torque to said differential assembly as said power take off assembly is being operated only by said induction motor.

2. The hybrid vehicle of claim 1 wherein said first source of energy comprises an electric battery.

3. The hybrid vehicle of claim 2 wherein said controller further has an adjustable stored value, and wherein said controller communicates a signal to said internal combustion engine to provide energy to said electric battery when said monitored state of charge is less than said adjustable stored value.

4. The hybrid vehicle of claim 3 wherein said controller deactivates said internal combustion engine after said internal combustion engine has provided a sufficient amount of electrical charge to said electrical battery, effective to cause said state of charge to exceed said adjustable stored value.

5. The hybrid vehicle of claim 4 wherein said controller deactivates internal combustion engine when said power take of off assembly is being operated unless energy is required to be provided to said electrical battery.

6. The hybrid vehicle of claim 5 further comprising a selectively depressible switch which is coupled to said controller and which is effective to cause said controller to selectively activate said power take off assembly by use of said first source of energy.

7. The hybrid vehicle of claim 1 wherein said first source of energy comprises a fuel cell assembly.

8. A power take off assembly for use within a hybrid vehicle of the type having a first source of energy, a second energy source, and a differential assembly, said power take off assembly comprising:

a power take off portion; and a controller which is coupled to said first and second energy sources and which selectively causes said power take off portion to be solely operated by said first energy source while allowing said second energy source to be operated only when a certain amount of energy has been depleted from said first energy source, while concomitantly allowing both of said first and said second energy sources to provide torque to said differential assembly as said power take off portion is being operated by only said first energy source.

9. The power take off assembly of claim 8 wherein said first source of energy comprises a battery and a motor.

10. The power take off assembly of claim 9 wherein said second source of energy comprises an internal combustion engine.

11. The power take off assembly of claim 10 wherein said electric battery has a varying state of charge and wherein said controller measures said varying state of charge and, based upon said measurement, activates said internal combustion engine.

12. The power take off assembly of claim 11 further comprising a selectively depressible switch which is coupled to said controller and which selectively causes said controller to operate said power take off portion by use of said first source of energy.

13. The power take off assembly of claim 8 wherein said first source of energy comprises a fuel cell assembly.

* * * * *